(12) United States Patent
Strachan et al.

(10) Patent No.: US 11,315,031 B2
(45) Date of Patent: Apr. 26, 2022

(54) USING MACHINE LEARNING REGRESSION TO ESTIMATE TIME FOR COMPLETING APPLICATION LIFECYCLE MANAGEMENT WORK ITEM

(71) Applicant: HEWLETT PACKARD ENTERPRISE DEVELOPMENT LP, Houston, TX (US)

(72) Inventors: Shaul Strachan, Yehud (IL); George Kour, Yehud (IL); Raz Regev, Yehud (IL)

(73) Assignee: Micro Focus LLC, Santa Clara, CA (US)

(*) Notice: Subject to any disclaimer, the term of this patent is extended or adjusted under 35 U.S.C. 154(b) by 1032 days.

(21) Appl. No.: 15/769,588

(22) PCT Filed: Oct. 20, 2015

(86) PCT No.: PCT/US2015/056466
§ 371 (c)(1),
(2) Date: Apr. 19, 2018

(87) PCT Pub. No.: WO2017/069743
PCT Pub. Date: Apr. 27, 2017

(65) Prior Publication Data
US 2018/0307998 A1    Oct. 25, 2018

(51) Int. Cl.
*G06Q 10/06* (2012.01)
*G06N 7/00* (2006.01)
(Continued)

(52) U.S. Cl.
CPC ............. *G06N 7/005* (2013.01); *G06F 9/44* (2013.01); *G06K 9/6217* (2013.01); *G06N 20/00* (2019.01);
(Continued)

(58) Field of Classification Search
CPC ........ G06N 7/005; G06N 20/00; G06N 5/003; G06F 9/44; G06F 8/71; G06K 9/6217;
(Continued)

(56) References Cited

U.S. PATENT DOCUMENTS 6,519,763 B1   2/2003   Kaufer et al.
6,694,009 B1   2/2004   Anderson et al.
(Continued)

FOREIGN PATENT DOCUMENTS

EP    1868099 A1 * 12/2007 ........... G06F 11/3664

OTHER PUBLICATIONS

Bush, William R., Jonathan D. Pincus, and David J. Sielaff. "A static analyzer for finding dynamic programming errors." Software: Practice and Experience 30.7 (2000): 775-802. (Year: 2000).*
(Continued)

*Primary Examiner* — Patricia H Munson
*Assistant Examiner* — Hamzeh Obaid

(57) ABSTRACT

A technique includes extracting data from a historical data store representing completed work items and associated features of the work items. The work items are associated with a lifecycle stage of an application. The technique includes training a regression model to estimate a time for completing a given work item based at least in part on the features.

20 Claims, 8 Drawing Sheets

(51) Int. Cl.
*G06N 20/00* (2019.01)
*G06F 9/44* (2018.01)
*G06K 9/62* (2022.01)
*G06F 8/71* (2018.01)
*G06N 5/00* (2006.01)

(52) U.S. Cl.
CPC ......... *G06Q 10/06* (2013.01); *G06Q 10/0631* (2013.01); *G06Q 10/063114* (2013.01); *G06F 8/71* (2013.01); *G06N 5/003* (2013.01)

(58) Field of Classification Search
CPC ............... G06Q 10/06; G06Q 10/0631; G06Q 10/063114
See application file for complete search history.

(56) References Cited

U.S. PATENT DOCUMENTS

| | | | |
|---|---|---|---|
| 7,660,705 | B1 | 2/2010 | Meek et al. |
| 7,941,427 | B2 | 5/2011 | Barsness et al. |
| 7,949,663 | B1 | 5/2011 | Cassone et al. |
| 8,875,088 | B1* | 10/2014 | Holler ................ G06Q 10/0631 717/101 |
| 2007/0124724 | A1 | 5/2007 | Irani |
| 2012/0016701 | A1 | 1/2012 | Narendra et al. |
| 2012/0174057 | A1 | 7/2012 | Narendra et al. |
| 2012/0185235 | A1 | 7/2012 | Albat |
| 2013/0325763 | A1* | 12/2013 | Cantor ................... G06Q 10/06 706/12 |
| 2014/0222497 | A1* | 8/2014 | Cantor ........... G06Q 10/063114 705/7.28 |
| 2014/0317590 | A1 | 10/2014 | Luke et al. |
| 2016/0011957 | A1* | 1/2016 | Bates .................. G06F 11/3664 714/38.1 |
| 2016/0055010 | A1* | 2/2016 | Baird .................... H04L 65/403 707/727 |

OTHER PUBLICATIONS

Harman, Mark, S. Afshin Mansouri, and Yuanyuan Zhang. "Search based software engineering: A comprehensive analysis and review of trends techniques and applications." (2009). (Year: 2009).*
Saxena, Prateek, et al. "Loop-extended symbolic execution on binary programs." Proceedings of the eighteenth international symposium on Software testing and analysis. 2009. (Year: 2009).*
Zhang, Hongyu, Liang Gong, and Steve Versteeg. "Predicting bug-fixing time: an empirical study of commercial software projects." 2013 35th International Conference on Software Engineering (ICSE). IEEE, 2013. (Year: 2013).*
Tan, Ching Siang, et al. "A review of feature extraction software for microarray gene expression data." BioMed research international 2014 (2014). (Year: 2014).*
International Search Report and Written Opinion dated Jul. 5, 2016, PCT Patent Application No. PCT/US2015/056466 dated Oct. 20, 2015, Korean Intellectual Property Office, 11 pages.
Smith, W. et al., "Predicting Application Run Times Using Historical Information,"(Research Paper), Aug. 26, 1998, 14 pages, available at http://toolkit.globus.org/ftppub/globus/papers/runtime.pdf.

* cited by examiner

USING MACHINE LEARNING REGRESSION TO ESTIMATE TIME FOR COMPLETING APPLICATION LIFECYCLE MANAGEMENT WORK ITEM

BACKGROUND

Application Lifecycle Management (ALM) software may be used for purposes of managing the planning, delivery, and support of applications. For example, an ALM system may be used to manage work items related to releasing a given application. As examples, the work item may be a defect in the application, a requirement for the application or an incident related to the application.

DETAILED DESCRIPTION

Figure 1:
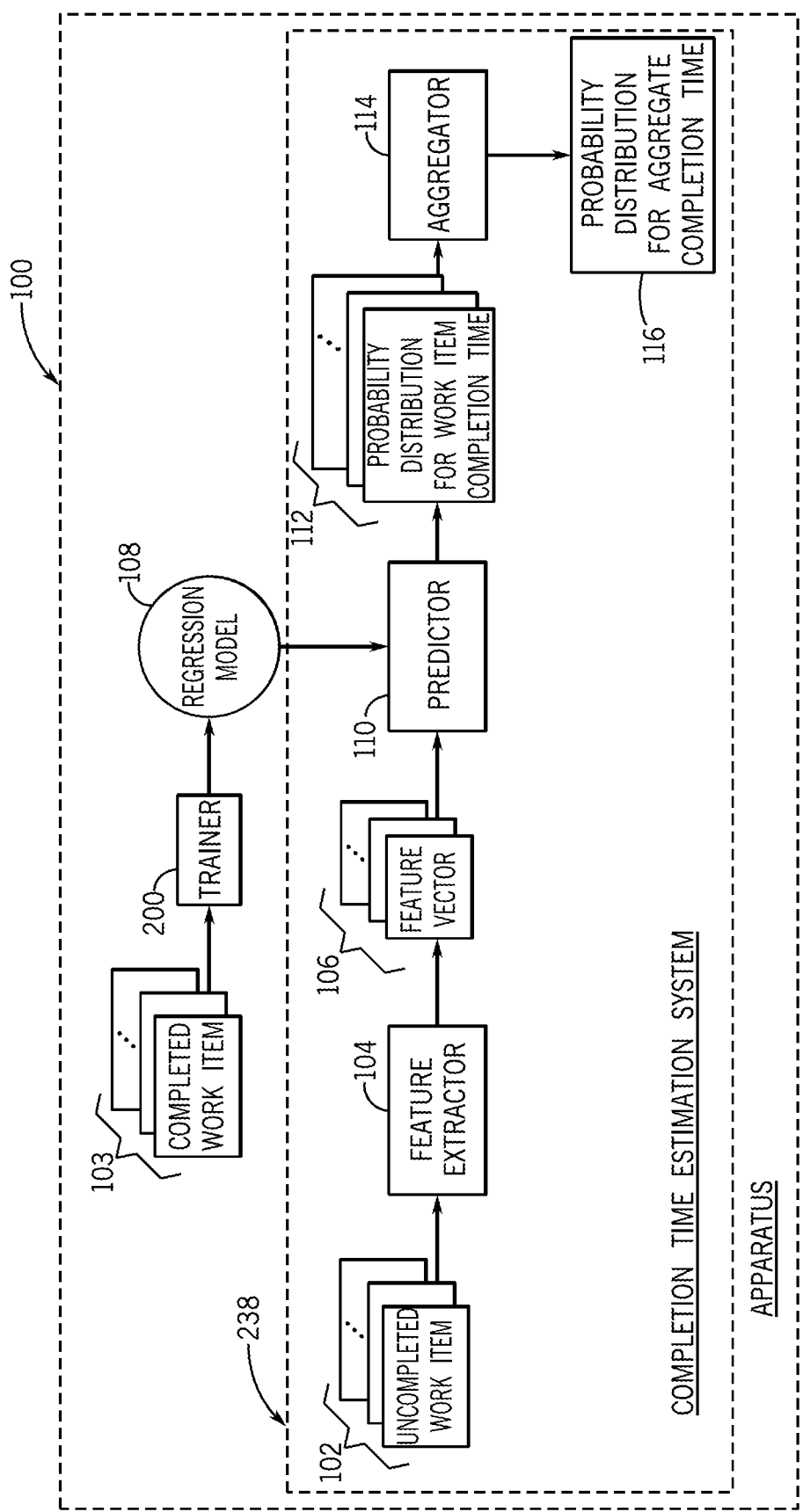
FIG. 1 is a schematic diagram of an apparatus to estimate an aggregate time for completing work items associated with an application lifecycle management (ALM) stage of an application according to an example implementation.

An application lifecycle management (ALM) system may be used to manage different lifecycle stages of an application, such as stages associated with the planning, delivery, and support of the application. As part of this management, the ALM system may be used to manage work items for a given lifecycle stage. For example, the release of a product containing the application typically involves resolving various work items related to the release, and resolving the work items may involve addressing defects of the application, implementing features in the application, or resolving incidents involving the application.

A management team in charge of a given lifecycle stage for the application may benefit from an estimate of the total, or aggregate, time for open, or uncompleted, work items that are associated with that stage to be completed. For example, such a time estimate may be used to set a planned release date for the application and/or determine whether to make adjustments to the content of the released application.

There are often multiple work items that arise in a given lifecycle stage of an application. One approach to estimate the aggregate time for completing a set of work items is to manually estimate the time to resolve each individual work item, so that the aggregate time is the sum of the manually estimated times. Another way to estimate the aggregate time for completing a number of work items involves estimating an average time for resolving a work item (by averaging times for defects previously resolved) and then multiplying the average time by the number of work items.

In accordance with example implementations that are disclosed herein, machine learning-based regression is applied to estimate a time for completing work items (herein called "uncompleted work items") that are associated with a given ALM stage. In this context, a "work item" is associated with an issue of an application and has an associated description (part of its associated record, described further herein) that describes features of the work item; and the work item has an associated creation date (the date when an associated record was created, for example). The machine learning-based regression uses a regression model that is trained on resolved, or completed, work items, to predict, or estimate, the time for completing a set of uncompleted work items. A completed work item has an associated completion date, or a date on which the work item was fixed or otherwise closed; and an uncompleted work item is open, or not closed. For the completed work item, the completion time may be part of the properties of the item or may be derived or inferred from the item's history (derived from an audit log, for example).

In general, a given work item may possess one or multiple of the following characteristics: the work item may represent a unit of work to be performed; at any given time, the state of the work item may be selected from a fixed list of states (new, open, fixed, closed, and so forth); the work item may be associated with historical information pertaining to transitions between states; and the work item may be associated with certain attributes that provide information about the work item, such as the product area associated with the work item, the author who created the description for work item or recognized the work item, the person or group to which the work item was assigned for resolution, and so forth.

For example implementations that are described herein, the work item is assumed to be associated with a defect of an application (for example, a programming "bug"). However, the work item may be related to an issue other than a defect, such as a requirement or an incident associated with the application, in accordance with further example implementations.

As a more specific example, FIG. 1 depicts an apparatus 100 that uses regression to determine an estimate of the aggregate time for completing work items 102 (herein called "uncompleted work items 102), in accordance with example implementations. For example, the uncompleted work items 102 may be associated with releasing a product containing an application, and the uncompleted work items 102 may be associated with defects of the application to be resolved before the product can be released. As an example, the apparatus 100 may be part of an ALM system, and the uncompleted work items 102 may be associated with a particular ALM stage.

As depicted in FIG. 1, the apparatus 100 may include a machine-based trainer 200, which trains a linear regression model 108 based on features of previously completed, or historic, work items 103 (herein called "completed work items 103) and time estimation system 238, in accordance with example implementations, may include a feature extractor 104, which extracts features of the uncompleted work item(s) 102 for purposes of generating a feature vector 106 for each work item 102. In general, the feature vector 106 is a selected set of work item features that correspond to the feature categories on which the regression model 108 is trained. As described further herein, the features associated with a given work item 102 may include the complexity of the work item 102, severity levels for the work item 102, uncertainty of solutions for the work item 102, and so forth.

In accordance with example implementations, a predictor 110 of the system 238 applies the feature vector(s) 106 to the regression model 108 for purposes of determining one or multiple probability distributions 112, where each probability distribution 112 represents an estimated time for completing an associated uncompleted work item 102. Assuming that multiple, individual probability distributions 112 (work items 102) exist, an aggregator 114 of the apparatus 100 combines the individual probability distributions 112 to derive the probability distribution 116, i.e., an estimate for the aggregate time for the uncompleted work items 102 to be completed.

Figures 2A, 2B:
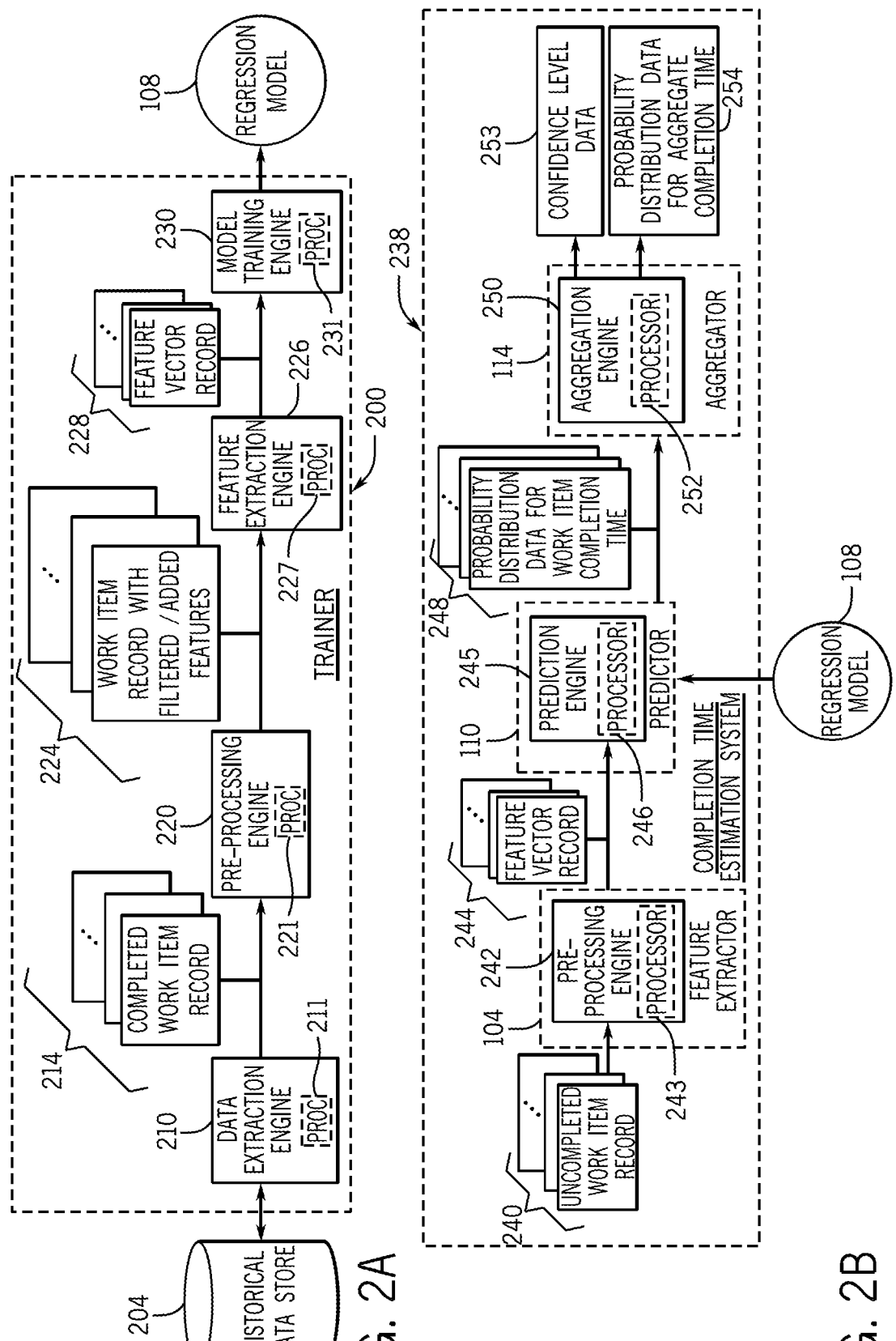
FIG. 2A is a schematic diagram of a regression model trainer according to an example implementation.
FIG. 2B is a schematic diagram of a completion time estimation system according to an example implementation.

Referring to FIG. 2A in conjunction with FIG. 1, in accordance with example implementations, the trainer 200 may include a data extraction engine 210, which accesses a historical data store 204 to retrieve historical, or completed, work item records 214. In this manner, the completed work item record 214 describes features of an associated completed work item 103 (a "defect" that has been closed, for example implementations described herein). In accordance with example implementations, these features may describe various states and characteristics of the work item 103, as further described below.

As an example, the completed work item record 214 may contain data organized in the following data fields: Summary, Description, Comments, Open Date, Severity, Status, Detected By, Assigned To, and so forth. It is noted that, in accordance with example implementations, the completed work item record 214 may be designated as corresponding to a completed work item 103 by having a completed "Handling Time" field or similar field.

In accordance with example implementations, the training system 200 includes a pre-processing engine 220, which processes the completed work item records 214 to generate corresponding work item records 224. In accordance with example implementations, the pre-processing engine 220 generates a given work item record 224 by transferring some features represented by a work item record 214 to a corresponding work item record 224; filters, or removes, some features represented by the work item records 214 so that these feature do not appear in the corresponding work item record 224; and adds features to the work item record 224, which are not present in the corresponding work item record 214.

More specifically, the pre-processing engine 220 may process the completed work item records 214 to generate the work item records 224 as follows. The pre-processing engine 220 may remove data fields from the completed work item records 214, which have relatively low population percentages. For example, a given data field may be an "Assigned To" data field, which may not be completed for a large portion of the completed work item records 214. For example, the pre-processing engine 220 may identify such data fields, by determining the frequency of each data field over the set of work item records 214 and then flag a given data field as having a relatively low population when its associated frequency is below a predetermined frequency. Due to the inadequacy of representation of a given data field that has such as relatively low population, the pre-processing engine 220 may eliminate, or filter, this data field so that the field does not appear in the corresponding work item record(s) 224.

Figure 4:
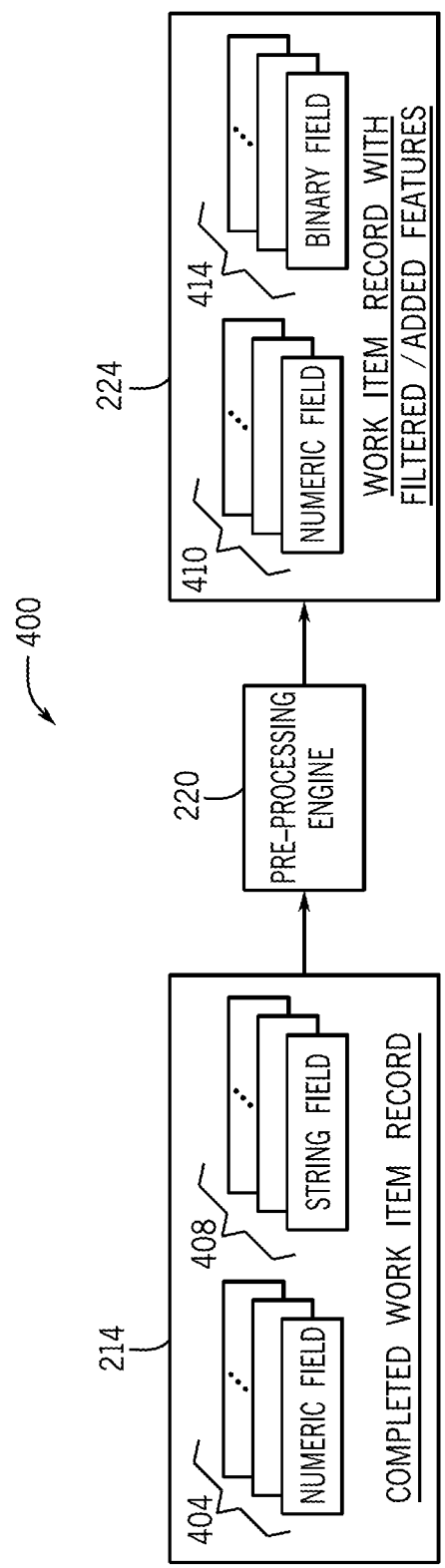
FIG. 4 illustrates pre-processing of work item data by the trainer of FIG. 2A according to an example implementation.

The pre-processing engine 220 may further process the data fields based on their associated data types. For example, referring to FIG. 4 in conjunction with FIG. 2A, in accordance with example implementations, the pre-processing engine 220 may process numeric fields 404 and string fields 408 of a given completed work item record 214 as shown in example illustration 400 differently. In general, a numeric field 404 refers to a data field that contains a number. For example, a completed work item record 214 may contain a Handling Time data field, a numeric field 404, which contains data that represents the total time (in days, for example) for the associated work item 103 to be completed. In accordance with example implementations, the pre-processing engine 220 passes through such numeric fields from the work item record 214 to form corresponding numeric fields 410 of the corresponding work item record 224.

A string field 408 refers to a data field that contains data, which represents a string. In accordance with example implementations, binary, integer, and real numbers may be relatively more suitable for training the regression model 108. Therefore, the pre-processing engine 220 may process strings to either eliminate the strings from the training data or transform the strings into binary, integer or real numbers. In this manner, the pre-processing engine 220 may either not include feature(s) associated with a given string in the work item record 224, or store feature(s) associated with the string in a numeric field 410 or binary field 414 of the work item record 224, as further described herein.

The string may be associated with a category, such as a severity level of the corresponding work item 103. For example, the string field 408 may contain data that represents a string that describes, in a natural language, values for a category, such as values of "High," Medium," or "Low" for a Severity category for the corresponding work item 103.

The string may be associated with a non-category. As examples, a string field 408 of the completed work item record 214 may be a Description data field, which contains data representing a string that describes the corresponding work item 103 in natural, descriptive language; or a Comments data field, which contains data representing a string that describes, in natural descriptive language, observed characteristics, attempted solutions or other useful information for the corresponding work item 103.

In accordance with example implementations, for each string field 408 that represents a category, the pre-processing engine 220 may create a binary indicator (a value of "0" or "1," for example) for each value of the category. For example, a Severity data field, a category field, may contain data representing either a "Low," "Medium," or "High" string; and the pre-processing engine 220 may correspondingly create three binary indicators to indicate the truth/false status for each of these three category values. In accordance with example implementations, the pre-processing engine 220 may create a corresponding binary field 414 for each binary indicator in the corresponding work item record 224. In accordance with further example implementations, the pre-processing engine 220 may transform a string category field into a numeric field. For example, for the Severity field in the work item record 214, the pre-processing engine 220 may create a numeric field 410 for the corresponding work item record 224, which contains an integer for each category value. In this manner, the pre-processing engine 220 may, for example, store data in the numeric field representing a "1" (for a Low severity), "2" (for a Medium severity) or "3" (for a High severity).

For certain non-category string fields, the pre-processing engine 220 may create a corresponding numeric field 410 in the work item record 224. For example, the pre-processing engine 220 may process the Description data field of the work item record 214 to assess complexity of the corresponding work item 103 and the pre-processing engine 210 may store a number in a numeric field 410 of the corresponding work item 224, which represents (on a scale of one to ten, for example) an assessed complexity of the work item 103. In this manner, in accordance with some implementations, the complexity determination may assume that the longer the length of the string in the Description field, the more complex the associated work item 103.

As another example, the pre-processing engine 220 may create a feature of the work item record 224 based on the length of the Comments data field of the work item record 214. In this manner, the pre-processing engine 220 may assume that the longer the string in the Comments, the more uncertainty may exist about the defect; and as such, the pre-processing engine 220 may store a number in a numeric field 410 of the corresponding work item 224, which represents (on a scale of one to ten, as an example) the assessed uncertainty.

In accordance with further implementations, the pre-processing engine 220 may determine work item complexity based on one or multiple factors other than string length. For example, the pre-processing engine 220 may employ text mining analysis in which the engine 220 searches the string for one or multiple keywords, which correlate to items that have higher associated completion times; and the preprocessing engine 220 may determine work item complexity based on the found keyword(s) in the string. As another example, the pre-processing engine 220 may perform sentiment analysis to extract important features of the string (a Comment string field, for example) that may have a direct effect on the defect handling time and determine a complexity based on the extracted feature(s).

In accordance with some implementations, for purposes of limiting the number of features of the work item record 224, the pre-processing engine 220 may group values for data fields with relatively low frequencies under a single "Other" data field (a numeric field 410, for example). For example, the pre-processing engine 220 may determine the frequencies of each data field over the set of work item records 214 and then flag a given value as having a low enough frequency to qualify for being included in the "Other" data field based on a comparison between the frequency and a predetermined threshold. In accordance with some implementations, the Other field may contain a number representing the number of qualifying fields for the associated work item record 214.

In accordance with some implementations, the pre-processing engine 220 may ignore, or filter out, other non-category string fields (string fields containing unique non-grouped values and memo fields, as examples).

Figure 5:
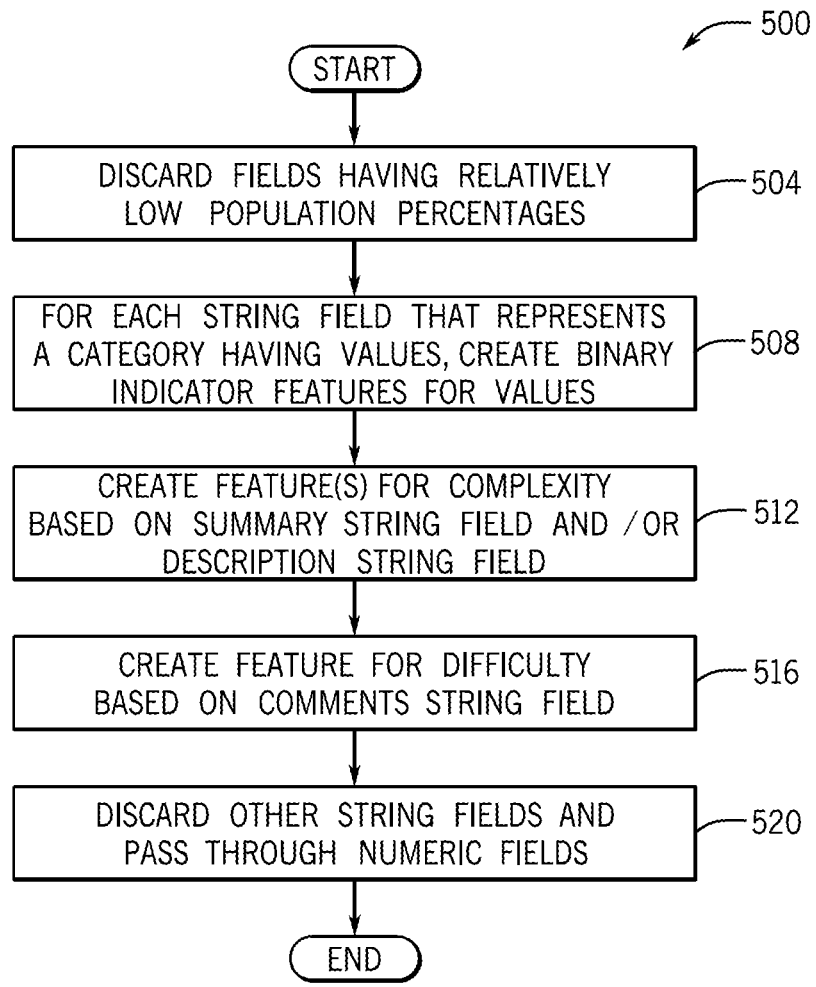
FIG. 5 is a flow diagram depicting a pre-processing technique used in the training of a regression model according to an example implementation.

Referring to FIG. 5, in conjunction with FIG. 2A, thus, in accordance with example implementations, the pre-processor engine 220 performs a technique 500 that includes discarding (block 504) fields having relatively low population percentages and for each string field that represents a category having values, creating (block 508) binary indicator features for the values. Pursuant to the technique 500, one or multiple features are created (block 512) for complexity based on the summary string field and/or the description string field. Moreover, pursuant to the technique 500, a feature for difficulty may be created (block 516) based on the comments string field; and other string fields may be discarded as well as numeric string fields may pass through, pursuant to block 520.

Referring back to FIG. 2A, in accordance with example implementations, a feature extraction engine 226 of the training system 200 processes the work item records 224 to generate corresponding feature vector records 228. In this manner, the work item record 224 contains numeric 410 and binary fields 414 (see FIG. 4), which represent potential features for training the regression model 108. The subset of these features that are used to train the regression model 108 may vary from project to project, and the feature extraction engine 226 may select a particular set of the features from the work item records 224 to form the feature vector records 228.

In accordance with example implementations, the feature vector record 228 represents a feature vector, or set of features, for training the regression model 108 to predict completion times for work items for an associated ALM stage. More specifically, in accordance with some implementations, the feature vectors (represented by the records 228) are used to train the regression model 108 to, for a given work item, generate a probability distribution describing the estimated time for the work item to be completed.

In accordance with further example implementations, all of the features of the work item records 224 may be used to train the regression model 108, and as such, for these example implementations, the trainer 200 may not include the feature extraction engine 226, or the engine 226 may be configured for certain projects to select all features of the work items 224 to generate the feature vectors. Thus, many implementations are contemplated, which are within the scope of the appended claims. In accordance with example implementations, a model training engine 230 of the training system 200 applies machine learning techniques to train/create the regression model 108 based on the features represented by the feature vector records 228. In accordance with some implementations, the model training engine 230 may apply a Random Forest machine learning algorithm to train the model 108, although the model training engine 230 may apply other machine learning techniques for purposes of training/creating the regression model 108, in accordance with further implementations.

Figure 3A:
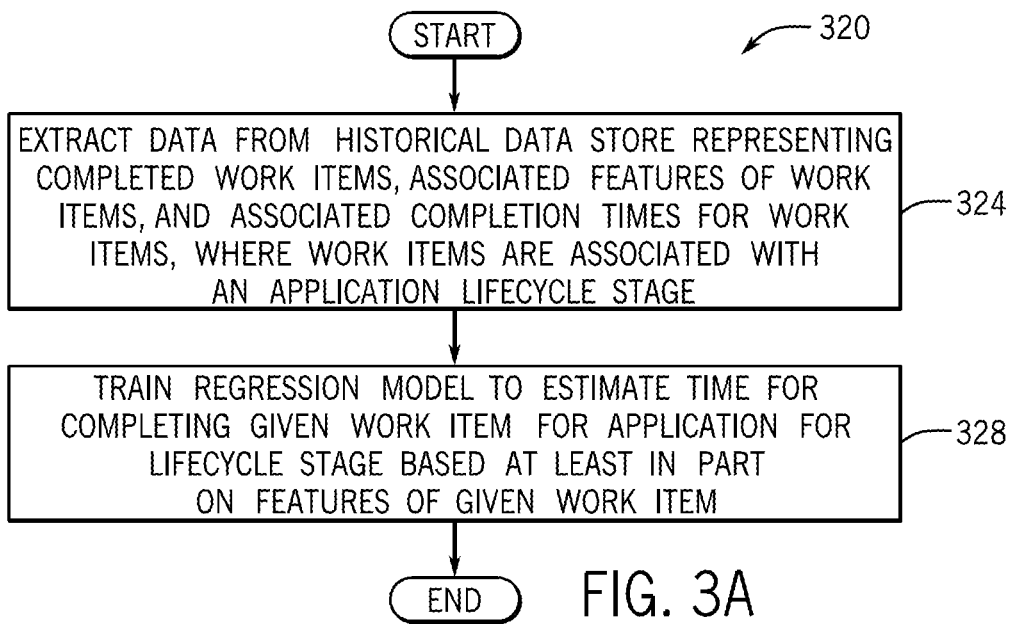
FIG. 3A a flow diagram depicting a technique to train a regression model according to an example implementation.

Referring to FIG. 3A in conjunction with FIG. 2A, thus, in accordance with example implementations, a technique 320 includes extracting (block 324) data from a historical data store representing completed work items and associated features of work items, where the work items are associated with a lifecycle stage of an application. The regression model is trained (block 328) to estimate a time for completing a given work item based at least in part on features of the given work item.

Referring to FIG. 2B in conjunction with FIG. 1, in accordance with example implementations, the completion time estimation system 238 may generate probability distribution data 254, which represents the probability distribution 116 for the estimated aggregate time to complete the work items 102 represented by work item records 240. Moreover, the completion time estimation system 238 may also provide, in accordance with example implementations, confidence level data 253, which represents a confidence level (a level between zero to one-hundred, for example) that the probability distribution 116 represented by the data 254 is correct. In this manner, a manager, for example, may use the confidence level to assess the reliability of the system's estimate of the aggregate completion time.

In accordance with example implementations, the feature extractor 104 includes a pre-processing engine 242, which processes the uncompleted work item records 240 to extract corresponding feature vector records 244 corresponding to the work item records 240. The pre-processing engine 242, in accordance with example implementations, selects features of the work item records 240 in a similar manner to the pre-processing engine 220 of the training system 200.

The predictor 110 may include a prediction engine 245 that applies the regression model 108 to the feature vectors (represented by feature vector records 244) to provide probability distribution records 248, where each record 248 corresponds to a probability distribution for an associated feature vector (and associated work item 102).

In accordance with example implementations, the prediction engine 110 assumes that the completion time for each uncompleted work item 102 is distributed according to a Weibull distribution and performs a numerical analysis to estimate the corresponding probability distribution 112 using expected and variance values, which are provided by the regression model 108.

In accordance with example implementations the aggregator 114 includes an aggregation engine 250, which combines the individual work item probability distributions 112 to generate the probability distribution data 254 that represents the probability that the collection of work items will be completed by a given time.

In accordance with some implementations, the aggregation engine 250 convolves the individual work item probability distributions 112 to determine the probability distribution 116. In particular, the aggregation engine 250 may use convolution to determine the probability distribution 116 in response the engine 250 determining that the number of uncompleted work items 102 is relatively small (less than a threshold, such as 30, for example).

Moreover, in accordance with example implementations, the aggregation engine 250 may apply a different technique to derive the probability distribution 116 when the number of uncompleted work items 102 is relatively larger (a number above a threshold, such as 30, for example). In this manner, in accordance with example implementations, the aggregation engine 250 may assume, according to the central limit theorem, that the probability distribution 116 may be closely approximated by a Gaussian, or normal, probability distribution when there exists a relatively large number of work items (over 30, as an example). Therefore, in lieu of convoluting a relatively large number of individual probability distributions, the aggregation engine 250 may take advantage of the strong law of large numbers to find the probability distribution of the aggregate completion time efficiently.

Figure 6:
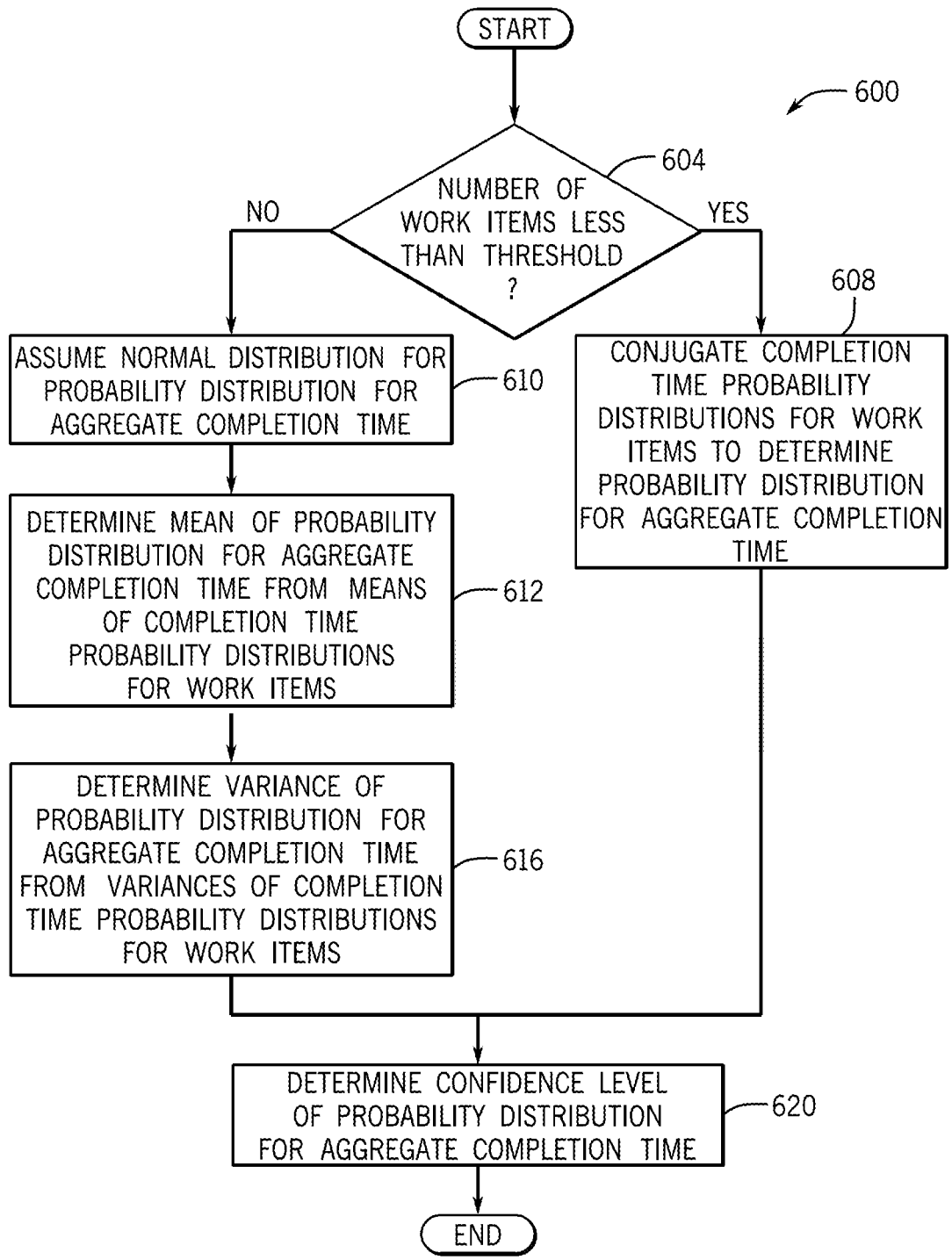
FIG. 6 is a flow diagram depicting a technique to combine probability distributions associated with work item completion times to generate a probability distribution of an aggregate work item completion time according to an example implementation.

Referring to FIG. 6 in conjunction with FIG. 2B, more specifically, in accordance with some implementations, the aggregation engine 250 may apply a technique 600 for purposes of determining the probability 116 (i.e., determine the probability data 254) and confidence level (represented by confidence level data 253). Pursuant to the technique 600, the aggregation engine 250 may determine (decision block 604) whether the number of uncompleted work items 102 is less than a threshold; and if so, the engine 250 may convolve the probability distributions 112 for the individual uncompleted work items 102 to determine the probability distribution 116.

Otherwise, pursuant to the technique 600, the aggregation engine 610 may assume (block 610) a Gaussian, or normal, distribution for the probability distribution 116, determine (block 612) a mean of the probability distribution 116 from the means of the individual probability distributions 112, pursuant to block 612, and determine (block 616) the variance of the probability distribution 116 from the variances of the individual probability distributions 112. For example, in accordance with some implementations, the aggregation engine 250 may determine the mean of the probability distribution 116 by summing the means of the individual probability distributions 112; and the aggregation engine 250 may determine the variance of the probability distribution 116 by summing the variances of the distributions 112 and taking the square root of this summation.

As also depicted in FIG. 6, in accordance with example implementations, the aggregation engine 250 may determine (block 620) a confidence level of the probability distribution 116. In accordance with some implementations, the aggregation engine 250 determines the confidence level by analyzing the variances of the individual probability distributions 112. For example, in accordance with some implementations, the aggregation engine 250 may determine the number of variances below or above a certain threshold and determine a confidence level based on this comparison. For example, in response to determining that the variances of all of the individual probability distributions 112 are less than one day, the engine 250 may assign a confidence level of 100 percent; and in response to determining that all of the variances of the distributions 112 are above five days, the aggregation engine 250 may assign a relatively low confidence level of 10 percent. In a similar manner, the aggregation engine 250 may assign different confidence levels based on comparing the variances to other thresholds. In general, the aggregation engine 250 may determine the frequencies of the variances and map these frequencies to different, discrete confidence levels between zero and one hundred percent. The aggregation engine 250 may determine the confidence level using other techniques, in accordance with further example implementations.

Referring to FIG. 2B, among its other features, in accordance with example implementations, the completion time estimation system 238 may contain a graphical user interface (GUI) engine 255 for purposes of displaying (on a display or monitor of a computer system, for example) a graphical representation of the work item analysis.

Figure 7:
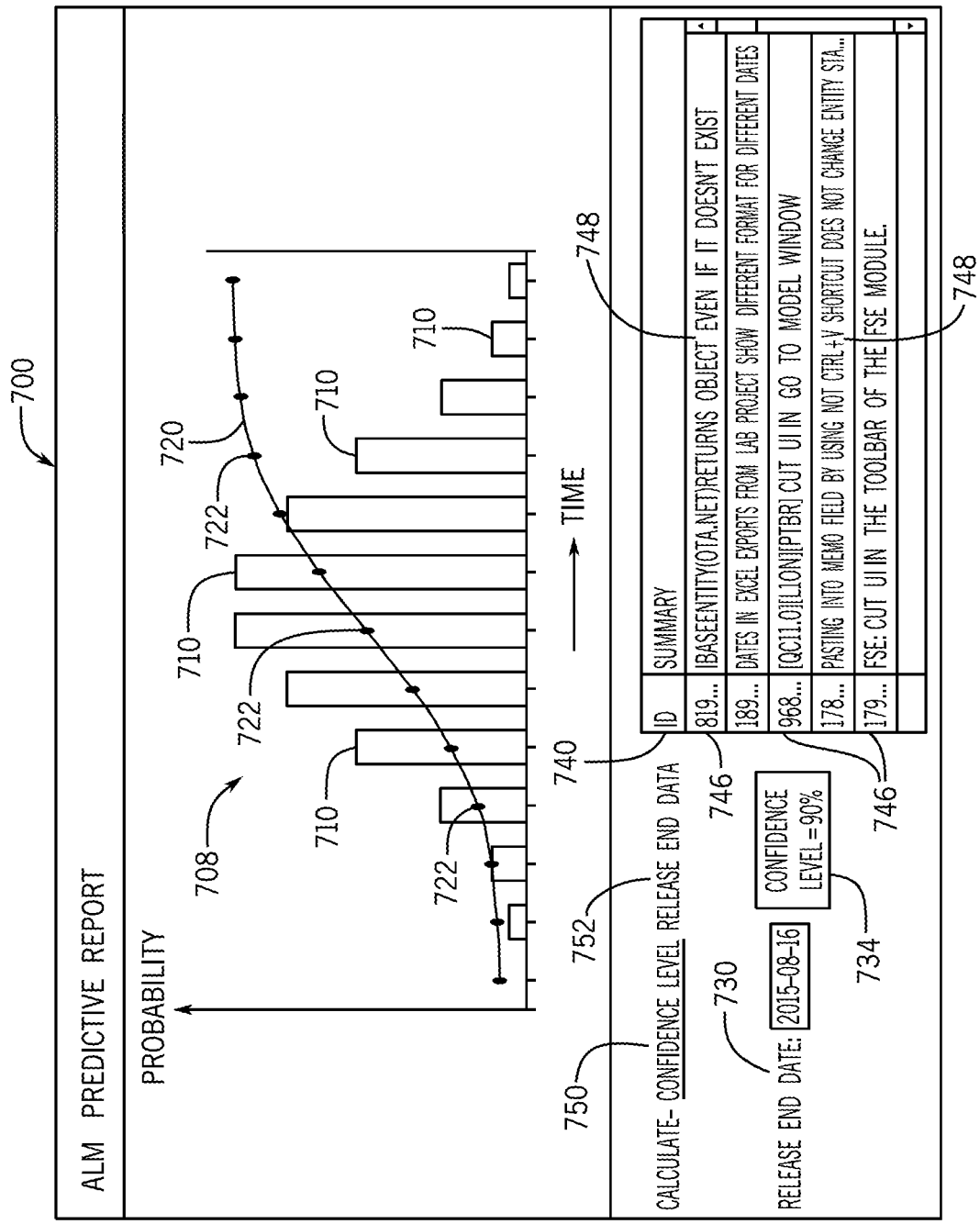
FIG. 7 is an illustration of a report displayed by the completion time estimation system of FIG. 2B according to an example implementation.

As a more specific example, FIG. 7 depicts an example image 700 that may be displayed by the GUI engine 255, in accordance with some implementations. As shown, for this example, the image 700 displays a discrete probability distribution 708 containing probability density function (PDF) bars 710 for individual days 722 for completion. For this example, the image 700 also displays a cumulative distribution function (CDF) 720. As also shown in FIG. 7, the GUI engine 255 may have selector buttons 750 and 752 for purposes of allowing a user to select calculation of the confidence level and release end data, respectively. For this example, the image 700 displays a release end date 730 and a confidence level 734.

The image 700 may display other information, such as a window 740 that contains various identifications (IDs) 746 and associated descriptions 748 of the related work items that are subject of the analysis by the completion time estimation system 238.

The GUI engine 244 may display different information and/or allow the input of different data, in accordance with further example implementations. For example, summing the number of days needed to handle every work item assumes that there is a single developer working on the work items, and this approach does not take into account simultaneous work on the work items by multiple developers. In accordance with some implementations, the GUI engine 255 may create a user interface (UI) to allow selection of the number of developers working simultaneously on fixing the work items. The selection of multiple developers changes the distribution 116 (see also FIG. 1) for the aggregate completion time, as the time (number of days, for example) to solve a given set of work items is less than when a single developer is assumed.

In accordance with example implementations, for multiple developers, the aggregation engine 250 (FIG. 2B) determines the mean of the distribution 116 by dividing the mean derived for a single developer by the number of developers. Moreover, in accordance with example implementations, for multiple developers, the aggregation engine 250 determines the variance as being the sum of the individual variances divided by the number of developers squared.

As another example of a variation from what is shown in FIG. 7, the GUI engine 255 may not display the PDF bars 710. Moreover, in accordance with further example implementations, the GUI engine 255 may not display the confidence level 734; but rather, the GUI engine 255 may display the CDF 720 on a scale of zero to one hundred percent, which the GUI engine 255 graphically labels as being a "confidence level." Referring to FIGS. 2A and 2B, in accordance with example implementations, the above-described engines of the trainer 200 and completion time estimation system 238 may include a hardware processors (Central Processing Unit (CPU) processing cores, for example) that execute machine executable instructions, or "software" to perform their above-described functions. Therefore, as depicted in FIGS. 2A and 2B, in accordance with example implementations, the engines 210, 220, 226, 230, 242, 245, and 250 may include hardware processors 211, 221, 227, 231, 243, 246, and 252 respectively.

Figure 3B:
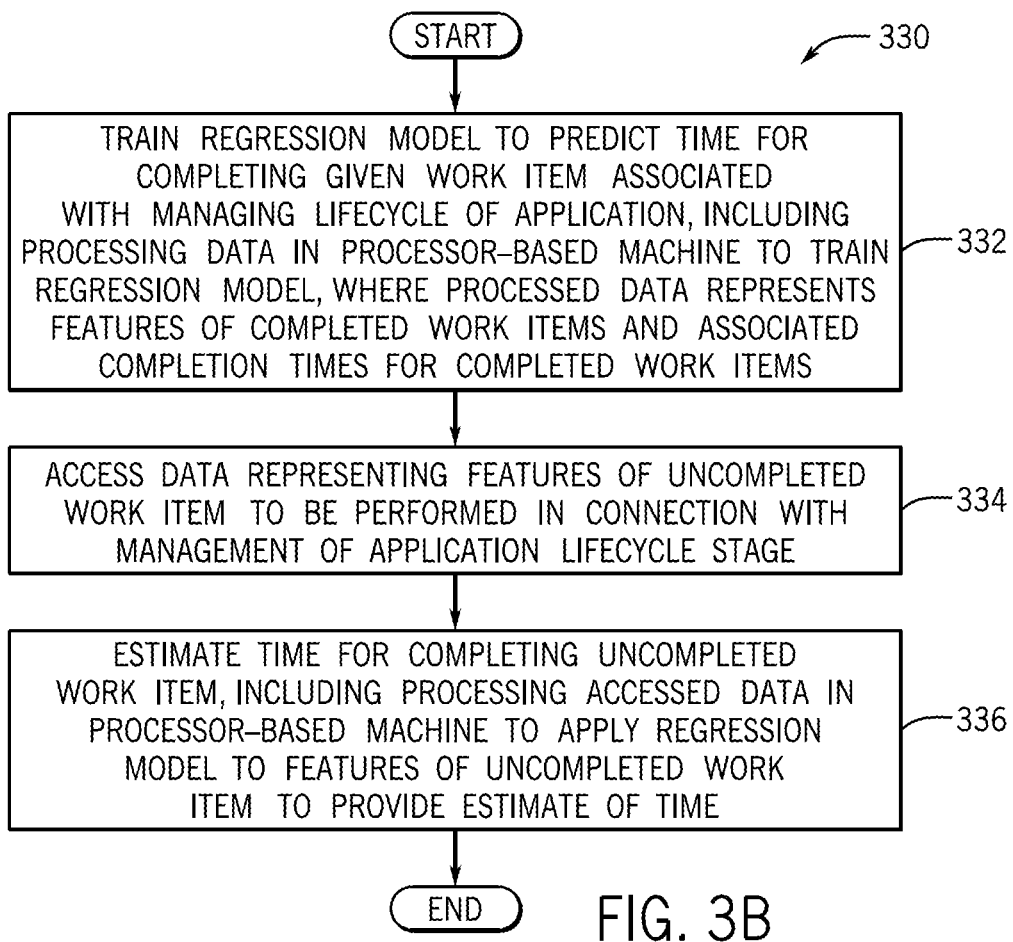
FIG. 3B is a flow diagram depicting a technique to apply machine learning regression to estimate a time for completing a work item according to an example implementation.

Referring to FIG. 3B, to summarize, in accordance with example implementations, a technique 330 includes training (block 332) a regression model to predict a time for completing a given work item that is associated with managing a lifecycle of an application. The training includes processing data in a processor-based machine to train the regression model, wherein the data represents features of completed work items and associated completion times for the completed work items. The technique 330 includes accessing (block 334) data that represents features of an uncompleted work item to be performed in connection with management of an application lifecycle stage and estimating (block 336) a time for completing the first uncompleted work item. Estimating the time includes processing the accessed data in a processor-based machine to apply the regression model to the features of the uncompleted work item to provide the estimate.

Figure 8:
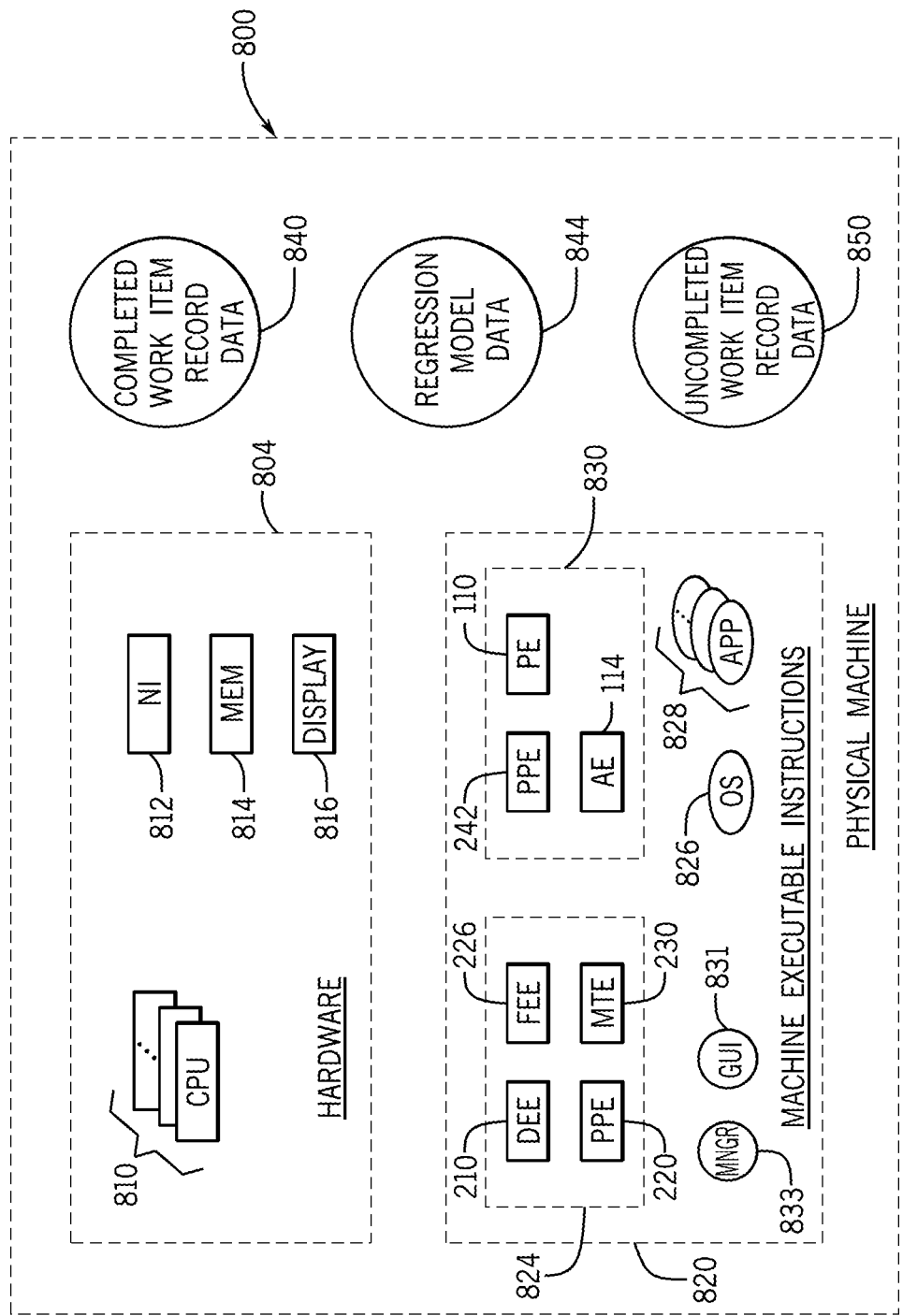
FIG. 8 is a schematic diagram of a physical machine according to an example implementation.

Referring to FIG. 8, in accordance with some implementations, the training system 200 (FIG. 2A) and/or closure time estimation system (FIG. 2B) may be part of a physical machine 800. The physical machine 800 is an actual machine that is made up of actual hardware 804 and actual machine executable instructions 820, or "software."

The hardware 804 may include, for example, one or multiple central processing units (CPUs) 810, a memory 814, a network interface 812, and a display 816. In general, the memory 814 may be a non-transitory storage medium that may store data, program instructions, data structures, and so forth, depending on the particular implementation. The memory 814 may be formed from semiconductor storage devices, phase change memory devices, magnetic storage devices, optical storage devices, memristors, and so forth, as well as one or more of these device types.

In accordance with example implementations, the memory 814 may store program instructions that when executed by the CPU(s) 810 cause the CPU(s) 810 to form one or more components 824 of the training engine 200 and/or one or multiple components 830 of the completion time estimation system 238.

Therefore, in accordance with example implementations, one or multiple of the components 824 and 830 may be software components, i.e., components formed by at least one processor executing machine executable instructions, or software. In further example implementations, one or multiple of the components 824 and 830 may be formed from dedicated hardware (one or more integrated circuits that contain logic configured to perform any of the functions of the components 824 and 830, as described herein). Thus, the components 824 and 830 may take on many different forms and may be based on software and/or hardware, depending on the particular implementation.

The memory 814 may store other data, in accordance with example implementations, such as data 840 represented completed work items (data representing the historical data store 204 of FIG. 1, for example); regression model data 844 representing parameters of the regression model 108; work item record data 850 representing completed work item records 214; current work item records 240; intermediate work item records 224; and so forth. Moreover, the memory 814 may store other data related to the input, intermediate and output data provided by the training system 200 and/or completion time estimation system 238, depending on the particular implementation.

The machine executable instructions 820 may contain other instructions that are executed by one or multiple CPU(s) 810 for purposes of forming one or more additional software components, such as an operating system 826, one or multiple applications 828, and so forth.

Other implementations are contemplated, which are within the scope of the appended claims. For example, in accordance with some implementations, one or multiple human managers may use the time estimate for such purposes as setting a planned release date for a product (i.e., the product associated with the work items), determining whether to make adjustments to the content of the product, determining staffing to address the work items, and so forth. In accordance with some implementations, the machine executable instructions 820 of the physical machine 800 may contain instructions that, when executed by one or multiple CPUs 810, cause the CPU(s) 810 to form an automated manager 833 that takes one or multiple actions based on the completion time estimate.

For example, in accordance with some implementations, the manager 833 may set a release date for releasing a product, based on the estimated completion time. For example, the manager 833 may select a specific completion time value from the cumulative density function (CDF) for a predetermined probability (a probability set via a user option, for example). Based on this completion time value, the manager 833 may select the release date.

As another example, in accordance with some implementations, the manager 833 may automatically postpone content of a product from being released for purposes of allowing the released content to meet a certain release date. As a more specific example, in accordance with some implementations, the manager 833 may participate in a series of iterations. For each iteration, the manager 833 may remove content items of one or multiple applications (of the product), which are associated with the lowest set of priorities, and the completion time estimation system 238 may then provide a completion time estimate for the work items associated with the retained content. If the new completion time estimate does not meet the release data, then the manager 833 may participate in another iteration to remove more content from the application(s) and/or one or multiple other applications. In this manner, in accordance with example implementations, the iterations may be performed until the content to be released meets the predicted release date.

The manager 833 may take other actions based on the completion time estimate, in accordance with further implementations.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method for automatically taking action in response to an estimated completion time, comprising:
   training, by a processor, a regression model to predict a time for completing a first uncompleted work item associated with managing a lifecycle stage of an application,
   wherein the training comprises processing data to train the regression model, and the data processed to train the regression model represents features of completed work items and associated completion times for the completed work items;
   accessing, by the processor, data representing features of the first uncompleted work item to be performed in connection with management of the lifecycle stage of the application,
   wherein a feature of the features of the first uncompleted work item is represented by a string;
   creating, by the processor, the feature of the features for the first uncompleted work item based at least in part on a length of the string;
   estimating, by the processor, a time for completing the first uncompleted work item, wherein estimating the time comprises processing the accessed data to apply the regression model to the features of the first uncompleted work item to provide the estimate; and
   automatically taking an action, by the processor, in response to the estimated time for completing the first uncompleted work item,
   wherein automatically taking the action comprises performing at least one of removing content of the application to regulate a date associated with a release of the application, and estimating the date associated with the release of the application based at least in part on the estimated time.

2. The method of claim 1, wherein estimating the time comprises determining a first probability distribution of the time for completing the first uncompleted work item.

3. The method of claim 2, further comprising:
   accessing, by the processor, data representing features of other uncompleted work items in the lifecycle stage of the application to be completed with the first uncompleted work item in the lifecycle stage of the application;
   applying machine learning regression, by the processor, to provide a plurality of second probability distributions for times for completing the other uncompleted work items; and
   determining, by the processor, a probability distribution based on the first probability distribution and the plurality of second probability distributions, the probability distribution representing an estimated aggregate time to complete the first uncompleted work item and the other uncompleted work items.

4. The method of claim 3, wherein determining the probability distribution comprises aggregating the first probability distribution and the plurality of second probability distributions.

5. The method of claim 3, wherein determining the probability distribution comprises combining means of the first probability distribution and the plurality of second probability distributions to determine a mean of the probability distribution and combining variances of the first probability distribution and the plurality of second probability distributions to determine a variance of the probability distribution.

6. The method of claim 4, wherein aggregating the first probability distribution and the plurality of second probability distributions for times for completing the other uncompleted work items and the probability distribution of the time for completing the first uncompleted work item comprises combining mean completion times and variances from the second probability distributions to determine a probability distribution for completing the first uncompleted work item and the other work items.

7. An article comprising a non-transitory computer readable storage medium to store instructions for automatically taking action in response to an estimated completion time, that when executed by a processor-based machine cause the processor-based machine to:
   extract data from a historical data store representing completed work items and associated features of the completed work items, wherein the completed work items are associated with a lifecycle stage of an application;
   train a regression model to estimate a time for completing a given work item for the lifecycle stage of the application based at least in part on features of the given work item,
   wherein a feature of the features of the given work item is represented by a string;
   create the feature for the given work item based at least in part on a length of the string; and
   automatically taking an action in response to the estimated time for completing the given work item,
   wherein automatically taking the action comprises performing at least one of removing content of the application to regulate a date associated with a release of the application, and estimating the date associated with the release of the application based at least in part on the estimated time.

8. The article of claim 7, wherein a feature of the completed work items is represented by a completed work item string, and the storage medium stores instructions that when executed by the processor-based machine cause the processor-based machine to:
   in response to the completed work item string representing values for a given category, create a binary feature for each value of the values; and
   train the regression model based on the binary features.

9. The article of claim 7, wherein the length represents a complexity of the given work item or a degree of difficulty in completing the given work item.

10. The article of claim 7, wherein the given work item comprises at least one of a defect in the application, a requirement for the application and an incident associated with the application.

11. An apparatus for automatically taking action in response to an aggregate completion time, comprising:
- a trainer comprising a hardware processor to train a regression model based at least in part on features of completed work items of a lifecycle stage of an application and associated completion times for the completed work items;
- a feature extractor comprising a hardware processor to process data representing features of uncompleted work items associated with management of the lifecycle stage of the application to determine an associated feature vector for each of the uncompleted work items;
- a predictor comprising a hardware processor to apply the feature vectors to the regression model to determine probability distributions of times for the uncompleted work items to be completed;
- an aggregator comprising a hardware processor to combine the probability distributions to determine a probability distribution for an aggregate time to complete the uncompleted work items,
- wherein the features of the uncompleted work items comprise strings describing the uncompleted work items, the feature vector comprises a component representing a complexity of the associated uncompleted work items, and the feature extractor determines the component for the associated uncompleted work items based on a length of a string field describing the associated uncompleted work items; and
- a manager comprising a hardware processor to automatically take an action based on the aggregate time for completing the uncompleted work items,
- wherein automatically taking the action comprises performing at least one of removing content of the application to regulate a date associated with a release of the application, and estimating the date associated with the release of the application based at least in part on the aggregate completion time.

12. The apparatus of claim 11, wherein the aggregator determines a confidence level associated with the probability distribution.

13. The apparatus of claim 11, wherein the aggregator combines mean completion times and variances from the probability distributions to determine the probability distribution for the aggregate time to complete the uncompleted work items.

14. The method of claim 3, further comprising determining, by the processor, a confidence level associated with probability distribution.

15. The method of claim 1, wherein a feature of the completed work items is represented by a completed work item string, the method further comprising:
- in response to the completed work item string representing values for a given category, creating, by the processor, a binary feature for each value of the values; and
- training, by the processor, the regression model based on the binary features.

16. The method of claim 1, wherein the length represents a complexity of the first uncompleted work item or a degree of difficulty in completing the first uncompleted work item.

17. The method of claim 1, wherein the first uncompleted work item comprises at least one of a defect in the application, a requirement for the application and an incident associated with the application.

18. The apparatus of claim 11, wherein a feature of the completed work items is represented by a completed work item string,
- wherein in response to the completed work item string representing values for a given category, the trainer creates a binary feature for each value of the values; and
- wherein the trainer trains the regression model based on the binary features.

19. The apparatus of claim 11, wherein the length represents a complexity of the associated uncompleted work item or a degree of difficulty in completing the associated uncompleted work item.

20. The apparatus of claim 11, wherein the associated uncompleted work item comprises at least one of a defect in the application, a requirement for the application and an incident associated with the application.

* * * * *